No. 709,717. Patented Sept. 23, 1902.
T. LYNCH.
NUT LOCK.
(Application filed Mar. 14, 1902.)
(No Model.)
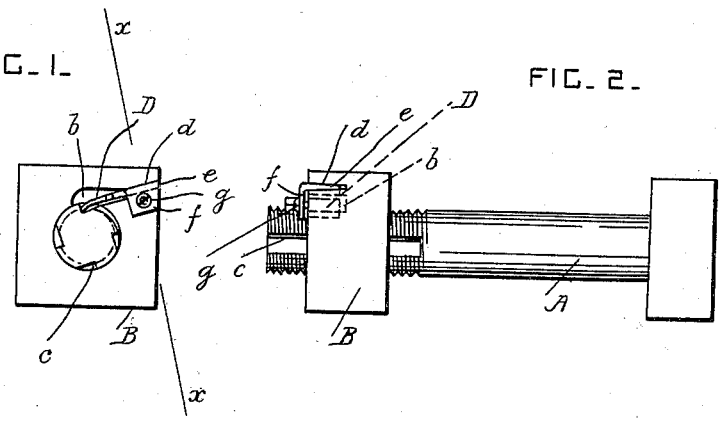

UNITED STATES PATENT OFFICE.

THOMAS LYNCH, OF PURITAN, PENNSYLVANIA.

NUT-LOCK.

SPECIFICATION forming part of Letters Patent No. 709,717, dated September 23, 1902.

Application filed March 14, 1902. Serial No. 98,198. (No model.)

*To all whom it may concern:*

Be it known that I, THOMAS LYNCH, a citizen of the United States, residing at Puritan, in the county of Cambria and State of Pennsylvania, have invented certain new and useful Improvements in Nut-Locks; and I do hereby declare the following to be a full, clear, and exact description of the invention, such as will enable others skilled in the art to which it appertains to make and use the same.

This invention relates to nut-locks provided with ratchets and flexible pawls; and it consists in the novel construction and combination of the parts hereinafter fully described and claimed.

In the drawings, Figure 1 is a plan view of a bolt provided with a nut and a nut-lock according to this invention. Fig. 2 is a side view of the same. Fig. 3 is a cross-section taken on the line $x\,x$ in Fig. 1.

A is the bolt and B is its nut, both being of any approved size and form. The bolt A is provided with longitudinal grooves $c$ in the screw-threaded portion of its periphery, and these grooves are spaced as near together as convenient. A chamber $b$ is formed in one side of the nut next to the bolt and at the upper end of the nut for the pawl to work in, and $d$ is a slot which is cut in the top of the nut between its outer side and the chamber $b$. This slot $d$ is arranged at a tangent to the periphery of the bolt.

D is a flexible spring-pawl provided with a tapering shank $e$, which has a flange $f$ at its top. The shank $e$ is wedged tightly into the slot $d$ of the nut and its flange comes above the top of the nut. A pin, rivet, screw, or other fastening device $g$ passes through the flange of the pawl and engages with the nut, so that the pawl is rigidly secured to the nut, but may be removed when required. The free end of the spring-pawl engages with the grooves of the bolt and permits the nut to be revolved in one direction only, so that the nut is locked to the bolt when screwed up.

What I claim is—

1. The combination, with a bolt provided with longitudinal grooves, of a nut having a chamber and a slot in its upper part, a spring locking-pawl provided with a shank which engages with the said slot and a flange which projects laterally from the top of the shank, and means for securing the said flange to the nut, substantially as set forth.

2. The combination, with a grooved bolt, of a nut provided with a slot in its upper part, a spring locking-pawl provided with a flanged and tapering shank which is wedged tightly into the said slot, and a fastening device which secures the flange of the said shank to the nut, substantially as set forth.

In testimony whereof I affix my signature in presence of two witnesses.

THOMAS LYNCH.

Witnesses:
HENRY PLUMMER,
S. W. LONG.